US009973457B2

(12) United States Patent
Cauchois et al.

(10) Patent No.: US 9,973,457 B2
(45) Date of Patent: May 15, 2018

(54) METHOD AND APPARATUS FOR LIVE CHAT INTEGRATION (71) Applicant: Nuance Communications, Inc., Burlington, MA (US)

(72) Inventors: Callixte Cauchois, Berkeley, CA (US); Alexandre Lebrun, Palo Alto, CA (US)

(73) Assignee: Nuance Communications, Inc., Burlington, MA (US)

( * ) Notice: Subject to any disclaimer, the term of this patent is extended or adjusted under 35 U.S.C. 154(b) by 409 days.

(21) Appl. No.: 13/927,658

(22) Filed: Jun. 26, 2013

(65) Prior Publication Data

US 2013/0346886 A1 Dec. 26, 2013

Related U.S. Application Data (60) Provisional application No. 61/664,419, filed on Jun. 26, 2012, provisional application No. 61/664,439, filed on Jun. 26, 2012.

(51) Int. Cl.
*G06F 3/00* (2006.01)
*G06F 3/048* (2013.01)
*H04L 12/58* (2006.01)
*G06F 17/00* (2006.01)

(52) U.S. Cl.
CPC .................................. *H04L 51/046* (2013.01)

(58) Field of Classification Search
None
See application file for complete search history.

(56) References Cited

U.S. PATENT DOCUMENTS

| 5,944,839 | A  | * | 8/1999 | Isenberg | G06F 11/2257 706/47 |
| 6,177,932 | B1 | * | 1/2001 | Galdes | G06F 17/30873 705/1.1 |
| 6,377,944 | B1 | * | 4/2002 | Busey | G06F 17/30867 |
| 6,434,549 | B1 | * | 8/2002 | Linetsky | G06F 17/30861 707/719 |
| 6,615,240 | B1 | * | 9/2003 | Sullivan | G06F 9/4446 707/999.01 |
| 7,170,993 | B2 | * | 1/2007 | Anderson | G06Q 30/02 379/219 |

(Continued)

*Primary Examiner* — Yongjia Pan
(74) *Attorney, Agent, or Firm* — Hamilton, Brook, Smith & Reynolds, P.C.

(57) ABSTRACT

A Live Chat (LC) system, apparatus, and method combine virtual agent (VA) and LC in a manner enabling a user to receive resolution of a contact request at a reduced cost and enhancing both the user and LC operator's experience. VAs may source response content for easier or more frequent user queries, whereas VAs may transfer a user query to an LC operator whenever a user query becomes too complicated, enabling the LC to source the response content. From the user's point of view, escalation from the VA to the LC operator happens in the very same user screen view used to contact the VA, enhancing the user's experience by providing seamless escalation. Conversation history between the user and the VA or formatted data related thereto may be provided to the LC operator, expediting the LC operator's response time and reducing a number of interactions needed to resolve the user's query.

25 Claims, 5 Drawing Sheets

(56) References Cited

U.S. PATENT DOCUMENTS

| | | | | |
|---|---|---|---|---|
| 7,257,514 B2* | 8/2007 | Faihe | | G06F 11/2257 702/183 |
| 7,630,910 B2* | 12/2009 | Bonissone | | G06Q 40/08 705/2 |
| 7,870,491 B1* | 1/2011 | Henderson | | G06F 9/4446 715/745 |
| 7,987,235 B2* | 7/2011 | Huynh | | G06Q 10/107 709/206 |
| 8,275,117 B2* | 9/2012 | Huet | | G06Q 10/10 379/265.02 |
| 8,279,779 B2* | 10/2012 | Singh | | H04L 41/0681 370/260 |
| 8,422,644 B2* | 4/2013 | Fan | | H04M 3/5166 379/211.02 |
| 8,601,030 B2* | 12/2013 | Bagchi | | G06F 17/30654 706/52 |
| 8,738,739 B2* | 5/2014 | Makar | | G06F 17/30867 709/202 |
| 8,767,945 B2* | 7/2014 | Simoes | | H04M 3/5191 379/265.02 |
| 8,787,553 B2* | 7/2014 | Fan | | H04M 3/5166 379/265.09 |
| 8,832,210 B2* | 9/2014 | Muszynski | | G06Q 30/01 709/206 |
| 8,918,459 B2* | 12/2014 | Smyth | | H04L 12/581 370/260 |
| 9,087,048 B2* | 7/2015 | Myslinski | | G06F 17/28 |
| 9,122,744 B2* | 9/2015 | Spivack | | G06F 17/30654 |
| 9,218,590 B2* | 12/2015 | Hodgin | | G06Q 10/00 |
| 2003/0179876 A1* | 9/2003 | Fox | | H04M 3/51 379/265.02 |
| 2003/0187696 A1* | 10/2003 | Bonissone | | G06Q 40/08 705/4 |
| 2004/0054693 A1* | 3/2004 | Bhatnagar | | G06Q 30/02 |
| 2004/0254998 A1* | 12/2004 | Horvitz | | G06Q 10/107 709/206 |
| 2005/0015508 A1* | 1/2005 | Hankejh | | G06Q 30/02 709/230 |
| 2005/0278213 A1* | 12/2005 | Faihe | | G06F 11/2257 702/183 |
| 2007/0025535 A1* | 2/2007 | Bushey | | H04M 3/42144 379/201.03 |
| 2007/0168457 A1* | 7/2007 | Huerta | | G06Q 30/02 709/217 |
| 2007/0260587 A1* | 11/2007 | Mohan | | G06Q 10/06 |
| 2008/0147804 A1* | 6/2008 | Gyure | | H04L 51/18 709/206 |
| 2008/0201407 A1* | 8/2008 | Fodor | | H04L 12/581 709/203 |
| 2008/0222537 A1* | 9/2008 | Alter | | G06Q 10/10 715/758 |
| 2009/0083380 A1* | 3/2009 | Smyth | | H04L 12/581 709/206 |
| 2009/0245500 A1* | 10/2009 | Wampler | | H04M 3/42382 379/265.09 |
| 2009/0276706 A1* | 11/2009 | Lukes | | G06F 11/263 715/708 |
| 2009/0313235 A1* | 12/2009 | Gounares | | G06Q 30/02 |
| 2010/0169148 A1* | 7/2010 | Oberhofer | | G06Q 10/06311 705/7.13 |
| 2010/0246800 A1* | 9/2010 | Geppert | | G06F 3/04817 379/265.02 |
| 2010/0324961 A1* | 12/2010 | Singh | | G06Q 30/016 705/304 |
| 2011/0078105 A1* | 3/2011 | Wallace | | G06F 17/30654 706/47 |
| 2011/0141919 A1* | 6/2011 | Singh | | H04L 41/0681 370/252 |
| 2011/0161431 A1* | 6/2011 | Jagannathan | | G06Q 10/10 709/206 |
| 2011/0238408 A1 | 9/2011 | Larchcvcquc et al. | | |
| 2011/0238409 A1 | 9/2011 | Larcheveque et al. | | |
| 2011/0270771 A1* | 11/2011 | Coursimault | | G06Q 10/06 705/304 |
| 2013/0117267 A1* | 5/2013 | Buryak | | G06F 17/30598 707/737 |
| 2014/0012626 A1* | 1/2014 | Ajmera | | G06Q 10/10 705/7.31 |
| 2014/0365461 A1* | 12/2014 | Buryak | | G06F 17/30598 707/710 |

* cited by examiner

VIRTUAL AGENT CONVERSATION — 310

- Click: Click here when you are ready to continue.
- Read through the payment information and check that everything is correct and then click Submit. Were you able to successfully edit your payment?
  - Yes, I was able to edit my payment.
  - No, I was not able to edit my payment.

No FAQ ⊙ 2:01:46 PM

- Click: No, I was not able to edit my payment.
- Would you like to be transferred to a Live Chat agent?
  Yes, please transfer me to a Live Chat agent
  No, do not transfer me to a Live Chat agent FAQs: General_Contact_0103_ContactAdvised ⊙ 2:01:56 PM

- Click: Yes
- OK, I'd be glad to connect you to a Live Chat agent. First, can you please tell me your full name?

No FAQ ⊙ 2:02:07 PM

- Michael Roberts

ESCALATION AND TRANSFER TO THE LIVE CHAT — 312

- Your wait time is estimated to be from 3 to 4 minutes.

No FAQ ⊙ 2:02:36 PM

- Please wait for a site operator to respond.

No FAQ ⊙ 2:02:39 PM

- You are now chatting with 'Melissa A Conto'

No FAQ ⊙ 2:03:19 PM

LIVE CHAT CONVERSATION — 314

- Mr. Roberts, I will be more than happy to assist you today. It is my priority to assist you with your payment and respond to any other questions that you have. As a valued customer, I will also review your account to ensure that you are getting the best value for your money.

No FAQ ⊙ 2:03:50 PM

- I made a payment online a few minutes ago, and need to edit the amount, as I don't think I paid the correct amount.

No FAQ ⊙ 2:04:53 PM

- I do understand how important it is to pay the correct amount.

No FAQ ⊙ 2:05:46 PM

- Can you please provide me with the last four digits of the Social Security number on the account?

No FAQ ⊙ 2:05:51 PM

- 3219

No FAQ ⊙ 2:06:17 PM

- Thank you.

No FAQ ⊙ 2:06:46 PM

METHOD AND APPARATUS FOR LIVE CHAT INTEGRATION

RELATED APPLICATIONS

This application claims the benefit of U.S. Provisional Application No. 61/664,419, filed on Jun. 26, 2012, and U.S. Provisional Application No. 61/664,439, filed on Jun. 26, 2012. The entire teachings of the above applications are incorporated herein by reference.

BACKGROUND OF THE INVENTION

Contact centers may use multiple channels to interact with customers. For example, contact centers may use traditional phone support or web channels, such as email and live chat, all of which have seen their volume increase.

SUMMARY OF THE INVENTION

According to one embodiment, a method may implement a live chat system. The method may provide a response to a query, entered by a user via a user screen view on a user interface and submitted to a virtual agent server hosting at least one virtual agent. The response may be provided to the user from the virtual agent server via the user screen view, in a manner maintaining continuity of conversation in the user screen view independent of whether the at least one virtual agent or a live chat operator, having access to the at least one virtual agent via a live chat server operatively coupled to the virtual agent, sources content of the response.

The method may provide a conversation history, between the user and the at least one virtual agent, to the live chat operator via an operator screen view on an operator interface in a manner enabling the live chat operator to source the response within a context of the conversation history.

Providing the conversation history may include (i) mirroring all query and response interactions since a last response was sourced by the live chat operator in the operator screen view or (ii) gathering metadata based on the user query, formatting the metadata gathered, and providing the metadata formatted in the operator screen view, wherein the metadata gathered may include at least one of: a user name, an identification of a root problem triggering the query, a support center contacted by the user, a product of interest to the user, other contextual information related to the query, or a combination thereof.

The method may identify a start of a chat session based on an initial query entered by the user. The method may allocate a unique global session identifier for the chat session started. The method may provide the unique global session identifier with the conversation history provided, identify an end of the chat session based on an end query entered by the user, and, responsively, deallocate the unique global session identifier allocated.

The method may apply at least one rule to the query to trigger a transfer of the query from the at least one virtual agent to the live chat operator to enable the live chat operator to process the query and source the response, in which case the at least one virtual agent may source the content of the response if the transfer is not triggered.

Applying the at least one rule may include processing a linguistic analysis of the query using a knowledge database operatively coupled to the virtual agent server and triggering the transfer if a result of the linguistic analysis indicates that the query is outside of a scope of the knowledge database.

Applying the at least one rule may include a user property, wherein the user property includes a very important person (VIP) priority status and further wherein the transfer may be triggered if an identifier of a user profile associated with the user indicates the VIP priority status.

The method may gather metadata related to query and response interaction with the user at the virtual agent independent of whether or not the at least one virtual agent or the live chat operator sources the content of the response. The method may record each query and response interaction at the virtual agent independent of whether or not the at least one virtual agent or the live chat operator sources the content of the response. Each query and response interaction may optionally be recorded in association with the metadata gathered. The method may utilize a response sourced by the live chat operator in response to a user query transferred from the at least one virtual agent to the live chat operator to enhance a knowledge database operatively coupled to the virtual agent server, the response enabling the at least one virtual agent to source the response to a future occurrence of the user query and preventing future transfer of the user query to the live chat operator.

The method may apply a linguistic analysis to the query at the at least one virtual agent and determine at least one proposed response to the query and a confidence metric associated with the at least one proposed response determined. The method may transfer the query, with the at least one proposed response and the confidence metric determined, to the live chat operator via an operator screen view on an operator interface. The method may enable the live chat operator to override the at least one proposed response transferred or to select from the at least one proposed response transferred to source the response in the user screen view.

The method may determine if the response from the live chat operator is sourced to the user screen view within a predetermined timeframe. The method may source the response from the at least one virtual agent if the predetermined timeframe is exhausted. The at least one virtual agent may source the content of the response based on the at least one proposed response and a comparison of the confidence metric determined with a confidence threshold.

If the confidence metric is above the confidence threshold, the response sourced by the at least one virtual agent may be selected from the at least one proposed response. If the confidence metric is not above the confidence threshold, the response sourced by the at least one virtual agent may be an alternative response.

Another example embodiment disclosed herein includes a system and an apparatus corresponding to operations consistent with the method embodiments disclosed herein.

Further, yet another example embodiment may include a non-transitory computer-readable medium having stored thereon a sequence of instructions which, when loaded and executed by a processor, causes the processor to perform methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In a Live Chat (LC) system, a virtual agent (VA) may be used for handling user requests (also referred to herein as contacts, queries, or user intents). However, VAs cannot handle 100% of the contacts they receive. For example, the user may need a complicated procedure to receive the help they ask for, or the user may want to talk to a human operator for reassurance, or very important person (VIP) treatment of the user may be identified and may require that a high level operator be involved. As such, a VA may be a first point of contact for a user. The VA may handle low value requests, whereas high value requests may be pre-qualified by the VA and then handled by LC agents (also referred to herein as human operators, LC operators, or customer service representatives). As such, VA and LC may be combined to give the user a good overall experience at a reduced cost. VAs may handle (i.e., source the content of the response) for easier and more frequent queries, whereas VAs may transfer a query to an LC operator whenever the user's query becomes too complicated, enabling the LC operator to source the content of the response to the query.

Figure 1:
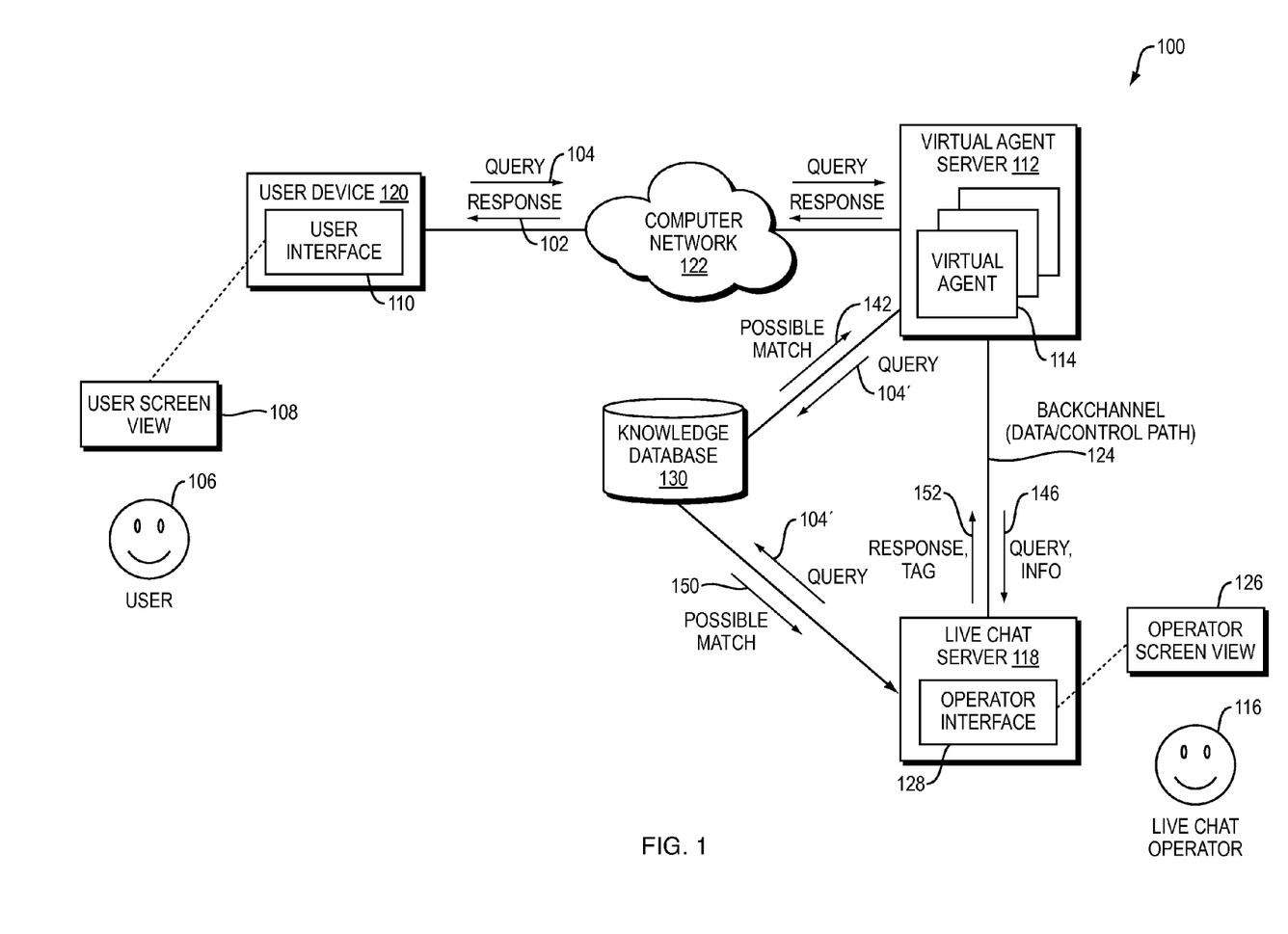
FIG. 1 is a block diagram of a Live Chat (LC) system according to an embodiment of the present invention.

FIG. 1 is a block diagram of an LC system 100 according to an embodiment of the present invention. According to embodiments disclosed herein, the LC system 100 may provide a response 102 to a query 104, entered by a user 106 via a user screen view 108 on a user interface 110 and submitted to a VA server 112 hosting at least one VA 114. The response 102 may be provided to the user 106 from the VA server 112 via the user screen view 108, in a manner maintaining continuity of conversation in the user screen view 108 independent of whether the at least one VA 114 or an LC operator 116, having access to the at least one VA 114 via an LC server 118 operatively coupled to the VA 114, sources content of the response.

The VA server 112 may be operatively coupled to a user device 120 via a computer network 122. The computer network 122 may be any suitable computer network. The user device 120 may include the user interface 110. The user interface 110 may be a display and keyboard, or any other suitable user interface. The user screen view 108 may be a web page in a user's browser, or any other suitable screen view. The at least one VA 114 may be operatively coupled to the LC server 118 via a backchannel communications link 124 between the VA server 112 and the LC server 118. The backchannel communications link 124 may be any suitable communications link.

Embodiments disclosed herein enable VAs and LC to be complementary as the user may be transferred from the machine (i.e., VA) to a person (LC operator) without the user needing to change interfaces. Integration between the two may be rich enough to provide combined metrics and full transcripts. Both systems may be active sequentially. For example, the user may either be connected to the VA 114 or to the LC operator 116.

The VA 114 may provide a conversation history, between the user 106 and the at least one VA 114, to the LC operator 116 via an operator screen view 126 on an operator interface 128 in a manner enabling the live chat operator 116 to source the response within a context of the conversation history. The LC system 100 may include a knowledge database 130 that may be operatively coupled to the VA 114 and the LC server 118. The knowledge database 130 may enable the VA 114 and the LC operator 116 to find response matches for the user query 104.

The knowledge database 130 may be a collection of user intents (i.e., patterns, matches, etc.). The knowledge database may include a sum of user queries that the VA 114 is able to respond to. A user query may have multiple possible responses. As such, the VA 114 or the LC operator 116 may respond by asking the user a question. A confidence index associated with a response may be computed using two components: a quality of the matching (e.g., is the query similar enough to known user intents) and past feedback (e.g., in past conversations with the same query, what did the LC operator or the user choose). The confidence index may be a value between 1 (very confident) and 0 (not understood).

The VA 114 may perform linguistic analysis on the query 104 and send the query 104' and try to match the user query against the knowledge database 130. The query 104' may be the same as the query 104 or a modified version of the query 104. The knowledge database 130 may return possible response matches 142. The VA 114 may escalate the query to the LC operator by sending the query and other information 146 to the LC server 118 for presenting to the LC operator 116 in the operator screen view 126. The LC operator 116 may source the content of the response via the LC server 118 that may provide the response content and other information 150 to the VA 114. To source the content of the response, the LC operator 116 may submit the query 104' to the knowledge database 130 to find a possible response 150. The VA 114 and the LC operator 116 may access same or different knowledge databases.

Figure 2:
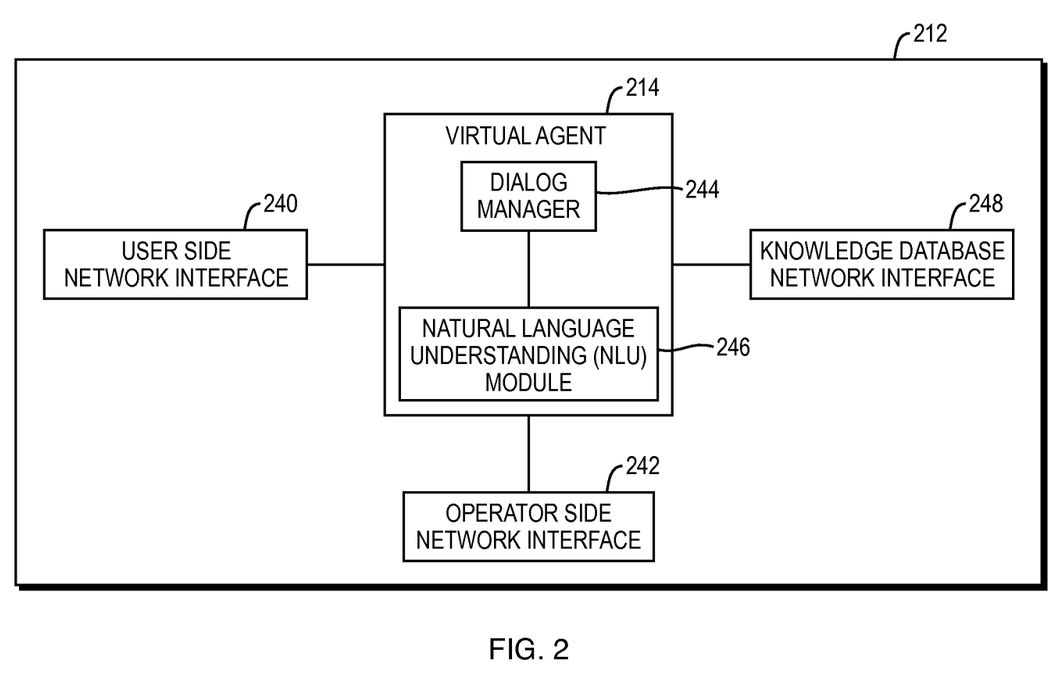
FIG. 2 is a block diagram of a Virtual Agent (VA) server according to an embodiment of the present invention.

FIG. 2 is a block diagram of a Virtual Agent (VA) server 212 according to an embodiment of the present invention. The VA server 212, may host at least one VA 214 and may include a user side network interface 240 and an operator side network interface 242. The VA server 212 and VA 214 may correspond to the VA server 112 and VA 114 of FIG. 1, respectively, or may be different. A user query may be submitted to the VA server 212 via the user side network interface 240 and the response may be provided to the user via the user side network interface 240. The user side network interface 212 may be operatively coupled to the user device 120 via the computer network 122 as shown in FIG. 1. The operator side network interface 242 may be operatively coupled the VA 214 to the LC server 118 via the backchannel communications path 124 as shown in FIG. 1.

The VA 214 may include a dialog manager 244, natural language understanding (NLU) module 246, and may be operatively coupled to the knowledge database 130 via a knowledge database network interface 248. To provide the conversation history (not shown), the dialog manager may be configured to: (i) mirror all query and response interactions since a last response was sourced by the LC operator 116 via the operator screen view 126 or (ii) gather metadata (not shown) based on the user query, format the metadata gathered, and provide the metadata formatted to the LC server 118 via the operator side network interface 242, wherein the metadata gathered may include at least one of: a user name, an identification of a root problem triggering the query, a support center contacted by the user, a product of interest to the user, other contextual information related to the query, or a combination thereof.

The at least one VA 214 may be configured to apply at least one rule to the query to trigger a transfer of the query to the LC operator 116 to enable the LC operator 116 to process the query and source the response. The at least one VA 214 may source the content of the response if the transfer is not triggered. To apply the at least one rule the NLU module 246 may be configured to perform a linguistic analysis of the query using the knowledge database 130 and the dialog manager 244 may be further configured to trigger the transfer if a result of the linguistic analysis indicates that the query is outside of a scope of the knowledge database 130.

The at least one rule may include a user property including a very important person (VIP) priority status. The dialog manager 244 may be further configured to trigger the transfer if an identifier (not shown) of a user profile (not shown) associated with the user 106 indicates the VIP priority status.

The at least one VA 214 may gather metadata related to query and response interaction with the user 106. The at least one VA 214 may record each query and response interaction independent of whether or not the at least one VA 214 or the LC operator 116 sources the content of the response. Each query and response interaction may optionally be recorded in association with the metadata gathered. The at least one VA 214 may utilize a response sourced by the LC operator 116 in response to a user query transferred from the at least one VA 214 to the LC operator 116 to enhance the knowledge database 130, enabling the at least one VA 214 to source the response to a future occurrence of the user query and preventing future transfer of the user query to the LC operator 116.

The at least one VA 214 may identify a start of a chat session based on an initial query entered by the user. The at least one VA 214 may allocate a unique global session identifier for the chat session started and provide the unique global session identifier with the conversation history provided to the LC operator 116. The at least one VA 214 may identify an end of the chat session based on an end query entered by the user and may, responsively, deallocate the unique global session identifier allocated.

The NLU module 246 may be configured to apply a linguistic analysis to the query and to determine at least one proposed response to the query and a confidence metric (also referred to herein as an index) associated with the at least one proposed response determined. The dialog manager 244 may transfer the query, with the at least one proposed response and the confidence metric determined, to the LC operator 116 in the operator screen view 126 enabling the LC operator to override the at least one proposed response transferred or to select from the at least one proposed response transferred to source the response in the user screen view 108. The at least one VA 214 may determine if the response from the LC operator 116 is sourced to the user screen view 108 within a predetermined timeframe.

The at least one VA 214 may source the response if the predetermined timeframe is exhausted. The dialog manager 244 may source the content of the response based on the at least one proposed response and a comparison of the confidence metric determined by the NLU module 246 with a confidence threshold. If the confidence metric is above the confidence threshold, the response sourced may be selected by the dialog manager 244 from the at least one proposed response (i.e. possible match) and if the confidence metric is not above the confidence threshold, the response sourced may be an alternative response.

According to embodiments disclosed herein, a VA may be a first point of contact. The VA may greet the user and try to solve the user's problem. Solving the user's problem may require getting information from another system, such as a catalog, a profile database, etc. Solving the use's problem may also require asking the user some questions, co-browsing the user to specific web pages. In doing so, the VA may determine the topic of the user request as well as its complexity. Based on the topic and the complexity determined, the VA may determine that it cannot solve the user's problem without assistance. For example, the VA may determine that the topic is not part of the VA's knowledge scope, or the VA may determine that the topic is too complex, and the VA may decide to escalate the user to a LC system.

According to embodiments disclosed herein, a user may experience seamless escalation. For example, if the user needs to be transferred to another channel, such as to the LC operator 116, the user does not have to repeat all the information already mentioned between the user 106 and the VA 214. Further, from the user's point of view, the experience before and after the transfer is similar, for example, an instant messaging type of interaction may be experienced before and after the transfer. Embodiments disclosed herein reduce the friction a user may experience during the escalation.

Figure 3:
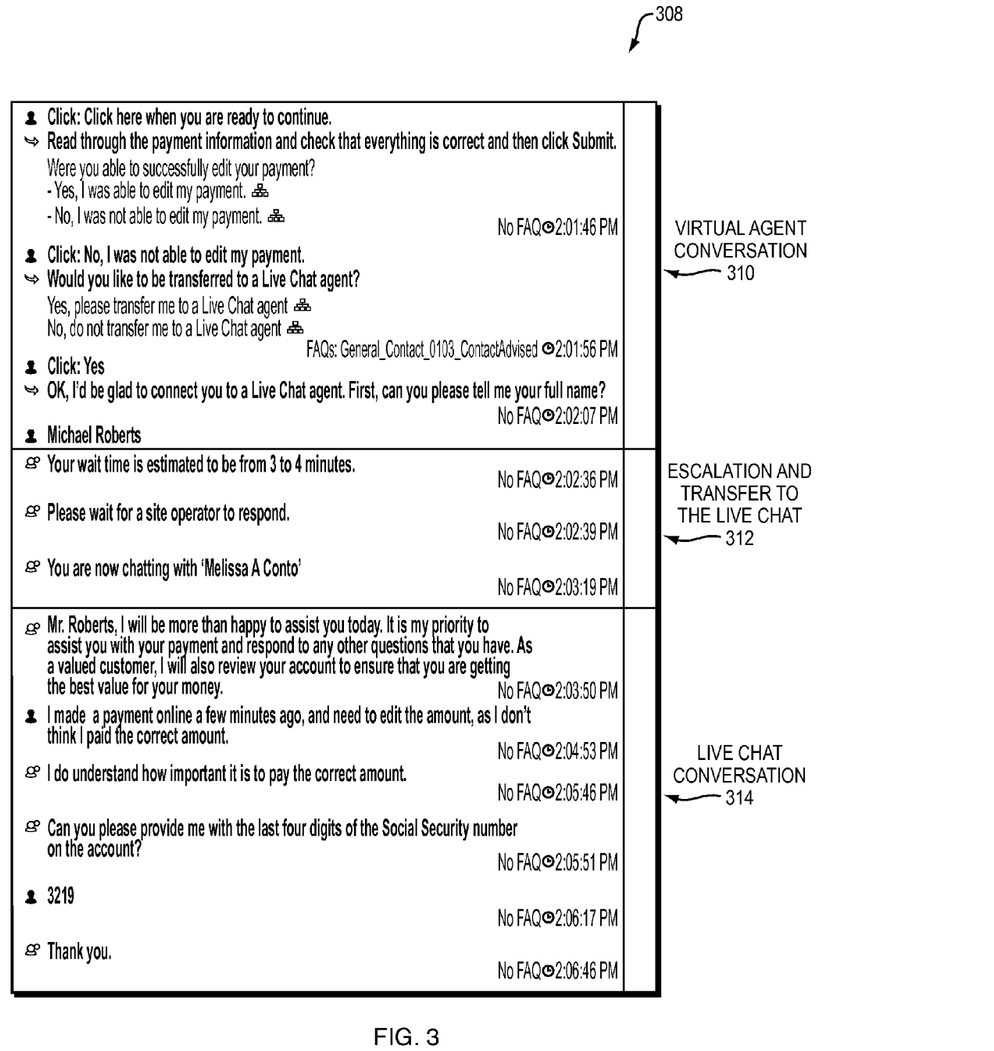
FIG. 3 is a block diagram of a user screen view according to an embodiment of the present invention.

FIG. 3 is a block diagram of a user screen view 308 according to an embodiment of the present invention. The user screen view 308 shows an example of a conversation history between the VA 214 and the user 106 that shows continuity of conversation in the user screen view independent of whether the at least one virtual agent or the LC operator sources content of the response. The VA conversation 310 and the LC conversation 314 may be merged into a unique conversation shown in the user screen view 308. The unique conversation may include the escalation 312 of the user query to the LC operator 116. As such, a unified conversation may be reviewed and analyzed. Graphical elements may be used to differentiate conversation with the VA 214 and the LC operator 116. The unified conversation shown in the user screen view 308 may also be provided in the operator screen view 126. As such, the transfer of the user to the LC operator 116 is seamless. The user remains in the same user screen view, such as a browser window, and maintains context of the conversation because the user is not transferred to another user interface that has no history of the interactions preceding the transfer. In addition, by providing the conversation history to the LC operator 116, the LC operator 116 is provide context enabling faster resolution. It should be understood that the user screen view 308 graphical elements, layout, conversation, and context thereof, may be any suitable graphical elements, layout, conversation, and context thereof.

Figure 4:
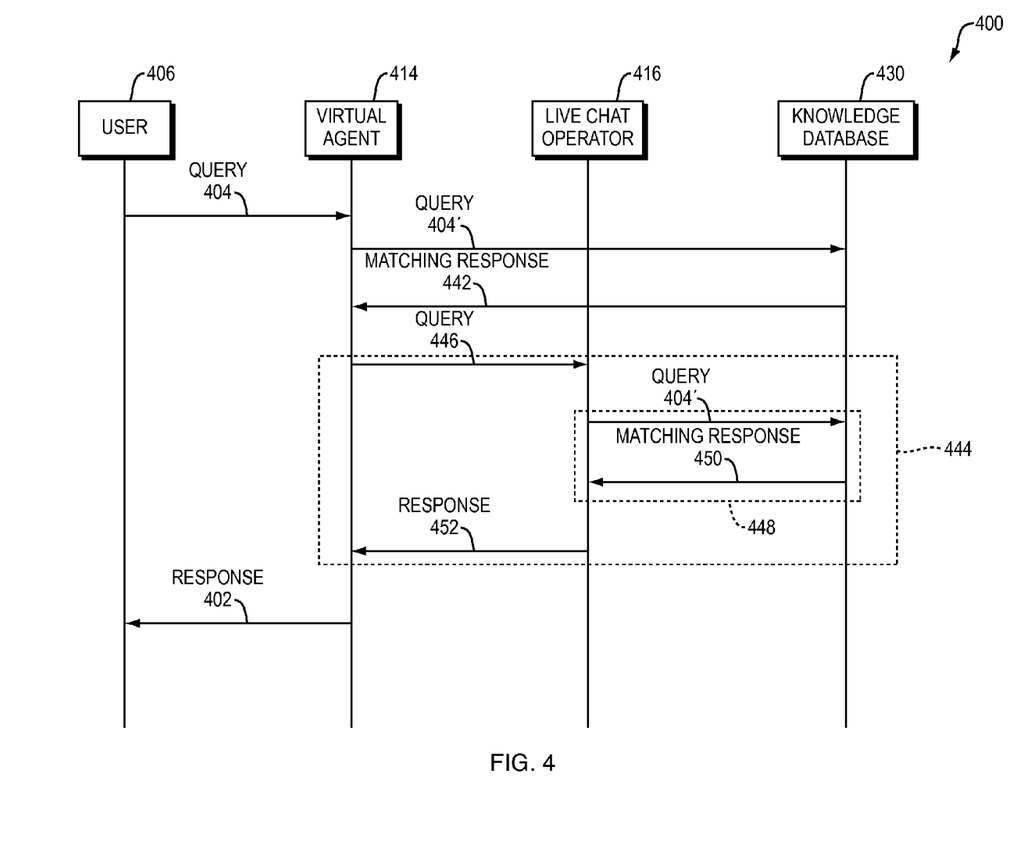
FIG. 4 is a transition diagram that follows a user query from the time it is entered to the time a response is provided according to an embodiment of the present invention.

FIG. 4 is a transition diagram (400) that follows a user query 404 from the time it is entered to the time a response 402 is provided according to an embodiment of the present invention. The VA 414 may receive the user query 404 and submit 404' the query to a knowledge database 430 that provides 442 possible response matches to the query 404. The VA 414 may perform linguistic analysis and try to match the user query against the knowledge database 430. If the confidence index of the match found is high enough, the VA 414 may source the response content and sends back the response 402 to the user 406.

However, if the VA 414 determines that escalation 444 to an LC operator 416 is needed, the VA 414 may provide the query 446 to the LC operator 416. The query 446 may included the query 404', that may be the query 404 or a modified version of the query 404, and may include other information, such as the conversation history, matching responses 442 from the knowledge database 430 and confidence indices associated therewith. The LC operator 416 may select from one of the matching responses 442 and may provide the response content and other information 452 to the VA 414. Alternatively, the LC operator 416 may access 448 the knowledge base 430 to find an alternate response 450, and provide the response content to the VA 414 and the VA provides the response 402 to the user 406. As such, regardless of whether the VA 414 or the LC operator 416 sources the content of the response 402, it is the VA 414 that provides the response 402 to the user 406.

According to one embodiment, the VA 414 may escalate 444 all queries to the LC operator 416, and the LC operator 414 may validate the response proposed by the VA 414 before the VA 114 provides the response 402 to the user 406. According to one embodiment, both the query and the response may be displayed in the operator screen view to one or several LC operators, enabling an LC operator to validate the response or to interject and provide an alternate response. The LC operator may be given an interjection time to select one of the responses, each response being associated with a respective confidence index. If none of the responses appear suitable, the LC operator may stop a counter corresponding to the interjection time, to browse the knowledge base to find a more suitable response, and to take over the conversation from the VA. If the LC operator does not act before the counter corresponding to the interjection time expires, the VA may reformulate the question and the possible intents may be sent to the user.

According to another embodiment, an amount of time the LC operator has in which to act may be based on the confidence index (e.g., the more the VA is confident, the less time the LC operator has to validate) and may also be based on other criteria, such as whether or not the LC operator has changed the response of a previous interaction, in which case the interjection time may be increased because the probability that the conversation cannot be properly handled by the VA may be higher.

In the LC system, a contact request may be entered on a queue of the LC system, based on the topic of the request. A Customer Support Representative (CSR), also referred to herein as a live chat operator, or LC operator, may pull requests, depending on their skillset and the topic. A skillset of the LC operator may be a level of the LC operator (e.g., first level, expert, etc.) or the LC operator's ability to solve a specific kind of problem. Based on the interaction (i.e., conversation) that took place with the virtual agent, the user's request may be escalated to an LC operator with a skillset appropriate to the request, increasing probability that the LC operator servicing the escalated request can resolve the request without a subsequent transfer to another LC operator.

According to embodiments disclosed herein, an LC operator pulling the request may receive all the information gathered by the VA. For example, the LC operator may be able to read a transcript of the conversation, such as the example VA conversation 310 shown in FIG. 3. Providing the transcript of the conversation, or conversation history, enables the LC operator to have context of the conversation that occurred prior to the escalation, enabling the LC operator to be on the same page as the user. In addition, the LC operator may review some structured data passed along by the VA. The structured data may include the topic, an may also include all the information gathered from the third party systems, such as a profile of the user, an order the user is inquiring about, etc. The structured data may enable the LC operator to solve the request faster, more easily and without asking again the questions already asked by the VA. As such, time spent by the LC operator on the request may be reduced as well as a cost of the contact.

According to embodiments disclosed herein, from the user's point of view, the escalation happens in the very same window used to contact the virtual agent. There may be slight transitions in some graphical elements, enabling the user to understand that the interaction is with an LC vs. a VA. For example, a VA avatar may be replaced by a photo of the LC (also referred to herein as a CSR), the name of the VA may be replaced by the name of the LC, etc. However, according to embodiments disclosed herein, the user still has access to the history of the conversation they had with the VA. The user does not have to switch context and re-state their name, email address, subject, etc.

At the end of the LC conversation with the live operator, the live operator may add one or more tags to the conversation, with regard to the topic, resolution outcome, such as success or failure, etc. Conversation tags may be sent back to the VA to be added and integrated into the whole conversation as metadata. According to embodiments disclosed herein, the VA conversation and the LC conversation may be merged into a unique conversation. As such, a unified conversation may be reviewed and analyzed. Graphical elements may be used to differentiate conversation with the VA and the LC operator, as shown in the example of FIG. 3.

Enabling the whole conversation to be displayed also enables display of side by side metrics relating to the VA and LC interactions. Report on investigation (ROI) metrics for the VA may be computed based on a result of the escalation. For example, a comparison of the topic found by the VA may be compared to the topic found by the LC operator based on the metadata as a result of the LC operator interaction.

A success rate may be computed using both VA metrics and the metadata from the LC operator. A total cost per contact may be assessed, based on the cost for a VA contact and the duration of the LC operator involvement during the conversation. Having these metrics side by side enables enhancement of the VA and LC strategies, so that both channels play well together.

According to embodiments disclosed herein, interactions between the user and the VA as well as the interactions between the user and the LC operator may go through the same channel, enabling the VA to monitor the LC part of the conversation. VA monitoring of the LC portion of the conversation enables the same linguistic and usage metrics to be applied and also enables the VA performance to be automatically enhanced based on data collected about how LC operators respond to user queries. VA monitoring of the LC portion of the conversation may impact VA configuration.

For example, by understanding how the LC operator responds to a user request, the VA configuration may be enhanced by suggesting new topics or new ways to express a topic, based on the LC operator's interaction with the user. For example, a user may be escalated to the LC operator because the VA is unable to completely comprehend the user query. The LC operator to whom the user query was transferred may proceed to ask some extra questions that enable the problem to be solved. Additional tags may be sent by the LC operator to the VA at the end of the conversation to indicate that it was related to a known topic. Reprocessing of the conversation may enable a known topic to be linked to the conversation. The next time a user enters the same query, the VA may have been enhanced enabling the VA to resolve the user query without a need to escalate, by mimicking resolution steps taken by the LC operator in the conversation linked to the topic. Enhancing the VA may include clustering and other statistical techniques. Using the same mechanism, a new topic may also be detected and added along with the resolution steps taken from the LC operator parts of the conversations.

As such, embodiments disclosed herein enable a cost efficient way to create and configure a VA. At the start of the project, the VA may be launched with little to no knowledge and may be shown to only a small part of the visitors of a web site. The VA may escalate most or all of the user queries. However, based on learning techniques disclosed above, the VA may be improved over time to handle more and more cases. As the knowledge of the VA improves, the VA may be shown to more and more users. The duration of this learning phase may depend on the volume of visitors the website receives. A resulting knowledge of the VA may be based on interaction between users and LCs. The VA may effectively know how to respond to the majority of the user queries, because the VA knowledge was derived from them. As such, a VA may be trained using this assisted learning and may have better success ratings.

According to embodiments disclosed herein, interactions between the user and any system pass through a VA server. The VA server may include a plugin to enable data exchange with an LC server. The VA server may forward messages to the LC operator or to the user depending on the direction of the message. The VA may perform some analysis on the messages and may store information based on the messages. Messages, such as poll messages from a user interface may be transferred to the LC server, as well as other meaningful messages. Some system messages, such as keep-alive messages, may be handled by the VA directly.

According to embodiments disclosed herein, an implementation of the LC server may be transparent. For example, as a connector is developed for a particular LC server, the connector may expose the same Application Programming Interface (API) to the VA server, such that a change comes at almost no additional cost and without the user noticing any change of the user interface in use.

When in doubt, VAs may ask the user to rephrase the query by suggesting frequent queries that the VA determines may be close to the user's original request. For a newly deployed VA, requests to rephrase may happen frequently, even for inputs that an LC may find recognizable. The initial VA configuration may be very error prone and may require some tweaking based on user input data before being able to manage the bulk of top volume requests. As disclosed above, VA monitoring of the conversation between the LC operator and the user may be enable the VA configuration to be enhanced. As such, a VA may benefit from a system that combines a VA with LC. On the other hand, LC may also benefit from a system that combines VA with LC.

For example, LC operators may follow well defined scripts, and only a few tools on the market assist CSRs with suggestions based on user query analysis. To enable an LC operator to handle conversations in qualified manner, LC operators may need to undergo significant training. Every time, once the query is received, the LC operator may either type in the answer or browse through a knowledge base to select the right response to give, operations that are painful and slow and for which a VA could bring value. Embodiments disclosed herein provide a system that may combine a VA and LC. VA and LC may be combined in a way that provides seamless channeling, aggregated metrics, and assisted learning for the VA. As such, VA and LC may be mutually beneficial: the LC may be there to supervise and to correct the VA, while the VA may be there to help and suggest answers to the LC.

According to embodiments disclosed herein, the user (also referred to herein as a customer) may receive a response faster and with higher quality answers. The LC operator may be enabled to handle more conversations at the same time, with a higher throughput. The LC operator's response time may be faster, since the correct response will usually be among the ones suggested by the VA. The VA provides higher quality answers because VA errors are corrected by the LC operator and because the VA may be enhanced based on learning from the LC operator input.

According to embodiments disclosed herein, a confidence index may be used as a main metric to govern the relationship between the VA and the LC as the interjection time directly may depend on its value. The confidence index represents how sure the VA is to have understood the user's query.

A part of the knowledge base accessed by or included in the VA is a collection of user intents (i.e., patterns, matches, etc.). The knowledge base may include a sum of user queries that the VA is able to respond to. A user issue may have multiple possible solutions. As such, the VA may respond by asking the user a question in order to troubleshoot the issue. The confidence index may be computed using two components: the quality of the matching (e.g., is the query similar enough to known user intents) and past feedback (e.g., in past conversations with the same query, what did the LC operator or the user choose). The confidence index may be a value between 1 (very confident) and 0 (not understood).

When a query is entered, a VA's first task may be to look through the knowledge base to find the user intent(s) closest to the user query. User intents may be represented as dots in a multi-dimensional semantic field. The closer two dots are in this field, the closer the meaning of the two user intents represented. For example, "I have a blue car" and "I have a red car" may be closer to each other than "I have a red car" and "I have a red pen," because "car" and "pen" convey more meaning than "red" or "blue."

According to one example, a distance d may defined on a semantic field and a way to compute d given two sentences (e.g., queries or intents) may be as follows. According to the example, the distance d may have three properties defining it as a distance, such as (i) $d(x, y) > 0$ if $x \mathrel{!=} y$ and $d(x, y) = 0 \leftrightarrow x = y$, (ii) $d(x, y) = d(y, x)$, and (iii) $d(x, y) \leq d(x, y) + d(y, z)$. According to the example, two thresholds, Tc and Tu, Tc<Tu, may be defined as follows. Given a user query q, for i being a user intent, (i) if $d(q, i) < Tc$, i is close enough to q and the VA can safely respond, and (ii) if $d(q, i) > Tu$, i is too far and i and q are considered as unrelated. Given a user query q, two sets of user intents may determine how the VA will respond and the confidence index, (i) $Ic(q) = \{i/d(q, i) < Tc\}$ and (ii) $Ir(q) = \{i/Tc \leq d(q, i) < Tu\}$. The number of elements of the two sets, as well as their geometry may impact the value of the confidence index. If Ic(q) has one and only one element, the confidence index will be high, close to 1. If Ic(q) has no elements it will be low, close to 0.

According to embodiments disclosed herein, the second main component of the confidence index may be the influence of past feedback. Feedback may be provided whenever a user or a LC operator selects a response that was presented by the VA. All feedback statements may be recorded and aggregated by clustering the user inputs: given a cluster of user inputs, the feedback statements of all the clustered inputs may be ranked by number of occurrences. Such an operation may be translated as: "when the user inputs something similar to this, most of the time this response is chosen as the most appropriate." From the two sets, two new sets may be derived: Fc(q) and Fr(q) by moving from Ic(q) to Ir(q) user intents that were never feedbacks and from Ir(q) to Ic(q) items that have a good ranking as feedbacks. New items would have an average ranking. In addition to the same formulas as in the previous step applied on the new set, the higher the ranking is, the better the confidence index will be. The confidence index values may range from 0 to 1. An interjection time (time the LC operator has to take control and change the response before it is sent to the user) may range from 0 to T, the maximum amount of time before the system has to send a response to the user. The higher the confidence index is the lower the interjection time. The interjection may decrease with the confidence index, but not proportionally. Both the confidence index as well as the interjection time may be shown on the LC operator's display. The confidence index and the interjection time may be displayed in any suitable manner, such by displaying the confidence index as gauge on a red to green scale or the interjection time as a timer.

According to embodiments disclosed herein, an exposure factor may be a number associated with an LC operator to which a particular interaction of a conversation is shown. The exposure factor may be used to arbitrate between the following two constraints (i) the lower the confidence index is the more the interaction should be shown to LC operators and (ii) LC operators should not be overwhelmed with too many conversations. A method for computing the exposure factor may be based on the confidence index, an index of the interaction in the conversation: the system has to make sure that the first interaction receives a proper response, the possibility that a particular LC operator already acted on the conversation: the subsequent interactions are then shown only to that particular LC operator, and the number of relatively available LC operators: an LC operator may have only a number of conversations shown to an LC operator may be based on a conversation threshold. Adjusting the exposure factor may enable success of a hybrid chat system as it may governs the ROI since it is linked to the number of LC operators needed to absorb the conversation volume.

According to embodiments disclosed herein, a multi-chat window may be composed of several chat tiles, each one containing a conversation and showing the previous interaction, the last user query, and the proposed response from the VA. A header of a tile may include a confidence scale and the remaining interjection time. In the middle of the tile the whole conversation may be presented, with focus on a last user query. The multi-chat window may enable scrolling up to enabling reading of the beginning o the conversation. Proposed responses found by the VA may shown below the conversation. The proposed VA responses may be color-coded to reflect distance form the user query. For example, green may be shown for the closest response, yellow for other matching responses, orange for potentially matching responses, and red for responses deemed irrelevant. The LC operator may click to select any of the proposed VA responses. Alternatively, the LC operator may type in an alternate response or browse the knowledge base to select a response.

For each LC operator, there may be two types of tiles: tiles containing conversations on which the LC has already acted, called active tiles, and the new ones, called passive tiles. Those of the first type may be grouped in a column, and may be relatively larger. The other ones may be in another column, may be smaller, and may be ordered by confidence index. The most important tiles may be expanded, and tiles of lesser importance may be collapsed and expanded by the LC operator. At a glance, an LC operator may see where the LC operator should focus attention.

An operator screen view may present a knowledge base browser. The LC operator may quickly find the relative knowledge item to respond to the user. The browser may be a combination of two areas: a tree view and a search pane. The knowledge base itself may be the same as the one used by the VA. The browser may be triggered by clicking on a browse button in a conversation tile. The browser may also remain open in the user interface and selected knowledge base items may be dragged and dropped to the desired conversation tile.

In addition to VA and LC metrics, dedicated metrics may be accessed. According to embodiments disclosed herein, a dedicated metric may be a relative number of interjections (an interjection being when an LC operator changes a suggested response). Another dedicated metric may be a relative number of validations (the LC operator just validated the suggested response). Yet another dedicated metric may be a relative number of time outs (the LC operator did not act before the end of the interjection time). The metrics may be accessed and shown as overall metrics for the global system or per LC operator.

Figure 5:
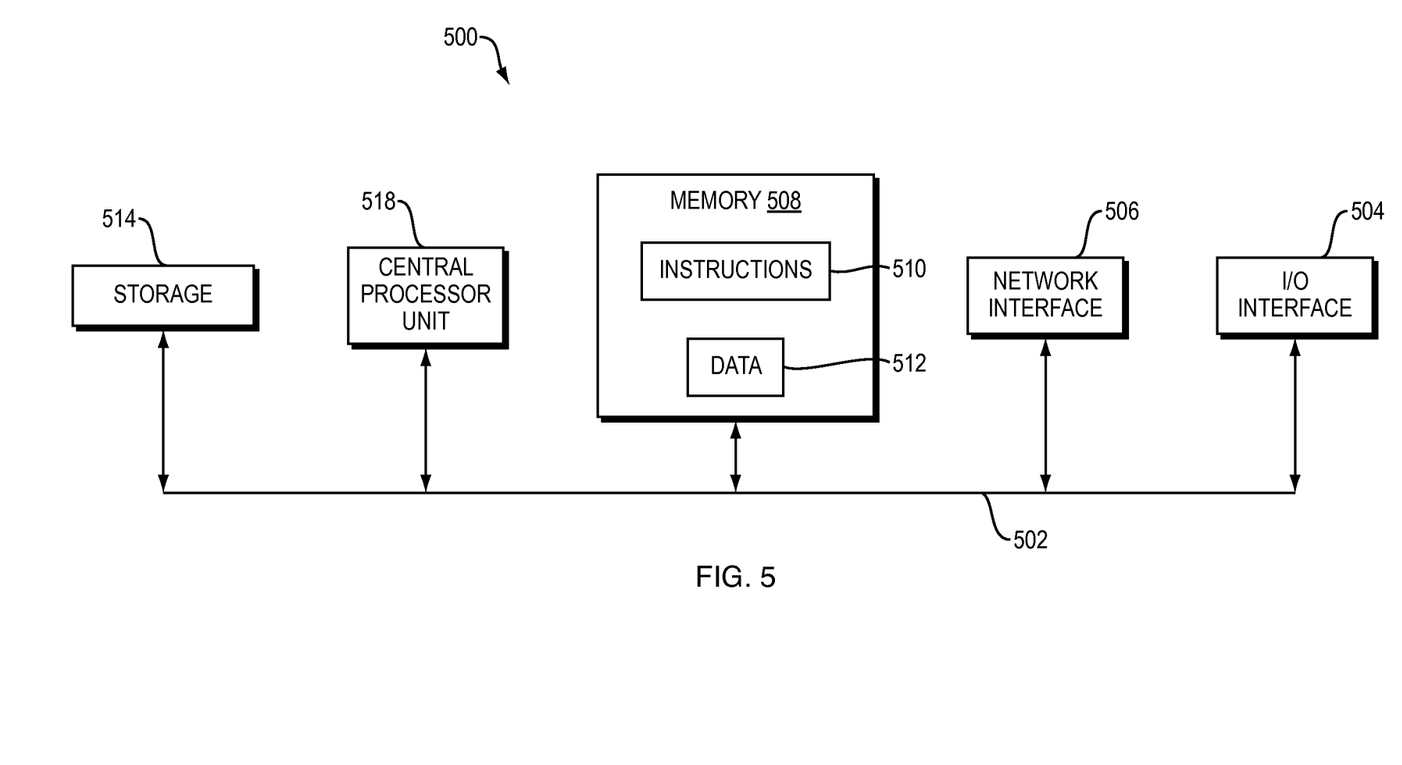
FIG. 5 is a block diagram of an example internal structure of a computer optionally within an embodiment disclosed herein.

FIG. 5 is a block diagram of an example of the internal structure of a computer 500 in which various embodiments of the present invention may be implemented. The computer 500 contains a system bus 502, where a bus is a set of hardware lines used for data transfer among the components of a computer or processing system. The system bus 502 is essentially a shared conduit that connects different elements of a computer system (e.g., processor, disk storage, memory, input/output ports, network ports, etc.) that enables the transfer of information between the elements. Operative with the system bus 502 is an I/O device interface 504 for connecting various input and output devices (e.g., keyboard, mouse, displays, printers, speakers, etc.) to the computer 500. A network interface 506 allows the computer 500 to connect to various other devices attached to a network. Memory 508 provides volatile storage for computer software instructions 510 and data 512 that may be used to implement embodiments of the present invention. Disk storage 514 provides non-volatile storage for computer software instructions 510 and data 512 that may be used to implement embodiments of the present invention. A central processor unit 518 is also operative with the system bus 502 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

It should be understood that the term "herein" is transferrable to an application or patent incorporating the teachings presented herein such that the subject matter, definitions, or data carries forward into the application or patent making the incorporation.

If implemented in software, the software may be written in any language that can support the example embodiments disclosed herein. The software may be stored in any form of non-transitory computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for implementing a live chat system, the method comprising:
providing a response to a query, entered by a user via a user screen view on a user interface and submitted to a virtual agent server hosting at least one virtual agent, the response provided to the user from the virtual agent server via the user screen view, in a manner maintaining continuity of conversation in the user screen view independent of whether the at least one virtual agent or a live chat operator, having access to the at least one virtual agent via a live chat server operatively coupled to the virtual agent, sources content of the response;
applying a linguistic analysis to the query at the at least one virtual agent and determining at least one proposed response to the query and a confidence metric associated with the at least one proposed response determined;
transferring the query, with the at least one proposed response and the confidence metric determined, to the live chat operator via an operator screen view on an operator interface; and
enabling the live chat operator to override the at least one proposed response transferred or to select from the at least one proposed response transferred to source the content of the response in the user screen view, wherein said providing the response to the query includes enabling the live chat operator to validate or change response content, proposed by the at least one virtual agent, within an interjection time, the interjection time being based on the confidence metric associated with the content proposed by the at least one virtual agent and whether or not the live chat operator changed a previous response proposed by the at least one virtual agent to a previous query.

2. The method of claim 1, further comprising:
providing a conversation history, between the user and the at least one virtual agent, to the live chat operator via the operator screen view on the operator interface in a manner enabling the live chat operator to source the content of the response within a context of the conversation history.

3. The method of claim 2, wherein providing the conversation history includes (i) mirroring all query and response interactions since a last response content was sourced by the live chat operator in the operator screen view or (ii) gathering metadata based on the user query, formatting the metadata gathered, and providing the metadata formatted in the operator screen view, wherein the metadata gathered includes at least one of: a user name, an identification of a root problem triggering the query, a support center contacted by the user, a product of interest to the user, other contextual information related to the query, or a combination thereof.

4. The method of claim 2, further comprising:
identifying a start of a chat session based on an initial query entered by the user;
allocating a unique global session identifier for the chat session started;
providing the unique global session identifier with the conversation history provided; and
identifying an end of the chat session based on an end query entered by the user and, responsively, deallocating the unique global session identifier allocated.

5. The method of claim 1, further comprising:
applying at least one rule to the query to trigger a transfer of the query from the at least one virtual agent to the live chat operator to enable the live chat operator to process the query and source the content of the response, wherein the at least one virtual agent sources the content of the response if the transfer is not triggered.

6. The method of claim 5, wherein applying the at least one rule includes processing the linguistic analysis of the query using a knowledge database operatively coupled to the virtual agent server and triggering the transfer if a result of the linguistic analysis indicates that the query is outside of a scope of the knowledge database.

7. The method of claim 5, wherein the at least one rule includes a user property, wherein the user property includes a very important person (VIP) priority status and further wherein the transfer is triggered if an identifier of a user profile associated with the user indicates the VIP priority status.

8. The method of claim 5, further comprising:
gathering metadata related to query and response interaction with the user at the virtual agent independent of whether or not the at least one virtual agent or the live chat operator sources the content of the response;
recording each query and response interaction at the virtual agent independent of whether or not the at least one virtual agent or the live chat operator sources the content of the response, each query and response interaction optionally recorded in association with the metadata gathered; and
utilizing content of a response sourced by the live chat operator in response to a user query transferred from the at least one virtual agent to the live chat operator to enhance a knowledge database operatively coupled to the virtual agent server, enabling the at least one virtual agent to source the content of the response to a future occurrence of the user query and preventing future transfer of the user query to the live chat operator.

9. The method of claim 1, further comprising:
   determining if the content of the response from the live chat operator is sourced to the user screen view within a predetermined timeframe; and
   sourcing the content of the response from the at least one virtual agent if the predetermined timeframe is exhausted, wherein the at least one virtual agent sources the content of the response based on the at least one proposed response and a comparison of the confidence metric determined with a confidence threshold.

10. The method of claim 9, wherein if the confidence metric is above the confidence threshold, the content of the response sourced by the at least one virtual agent is selected from the at least one proposed response and wherein if the confidence metric is not above the confidence threshold, the content of the response sourced by the at least one virtual agent is an alternative response.

11. The method of claim 1, wherein a counter corresponds to the interjection time and further wherein the enabling further includes enabling the live chat operator to interact with the counter to prolong the interjection time.

12. The method of claim 1, further comprising mirroring all query and response interactions since a last response content was sourced by the live chat operator in the operator screen view.

13. A live chat system comprising:
   a virtual agent server, hosting at least one virtual agent accessible by a user via a user screen view on a user interface, the virtual agent server operatively coupled to a live chat server, the at least one virtual agent being accessible to a live chat operator via an operator screen view on an operator interface, the virtual agent server including a user side network interface and an operator side network interface, the at least one virtual agent configured to:
      provide a response to a query, entered by a user via the user screen view on a user interface and submitted to the user side network interface of the virtual agent server, the response provided via the user side network interface to the user from the virtual agent server via the user screen view, in a manner maintaining continuity of conversation in the user screen view independent of whether the at least one virtual agent or the live chat operator sources content of the response, wherein the at least one virtual agent includes:
      a natural language understanding unit (NLU) configured to apply a linguistic analysis to the query and determine at least one proposed response to the query and a confidence metric associated with the at least one proposed response determined; and
      a dialog manager configured to transfer the query, with the at least one proposed response and the confidence metric determined, to the live chat operator in the operator screen view enabling the live chat operator to override the at least one proposed response transferred or to select from the at least one proposed response transferred to source the content of the response in the user screen view, wherein, to provide the response, the dialog manager is further configured to enable the live chat operator to validate or change response content, proposed by the at least one virtual agent, within an interjection time, the interjection time based on a confidence metric associated with the content proposed by the at least one virtual agent and whether or not the live chat operator changed a previous response proposed by the at least one virtual agent to a previous query.

14. The live chat system of claim 13, wherein the at least one virtual agent is configured to provide a conversation history, between the user and the at least one virtual agent, to the live chat server via the operator side network interface, in a manner enabling the live operator to source the content of the response within a context of the conversation history.

15. The live chat system of claim 14, wherein, to provide the conversation history, the dialog manager is further configured to: (i) mirror all query and response interactions since a last response content was sourced by the live chat operator via the operator screen view or (ii) gather metadata based on the user query, format the metadata gathered, and provide the metadata formatted to the live chat server via the operator side network interface, wherein the metadata gathered includes at least one of: a user name, an identification of a root problem triggering the query, a support center contacted by the user, a product of interest to the user, other contextual information related to the query, or a combination thereof.

16. The live chat system of claim 13, wherein the at least one virtual agent is operatively coupled to a knowledge database, and wherein the at least one virtual agent is further configured to:
   apply at least one rule to the query to trigger a transfer of the query to the live chat operator to enable the live chat operator to process the query and source the content of the response, wherein the at least one virtual agent sources the content of the response if the transfer is not triggered, and wherein, to apply the at least one rule, the NLU is further configured to perform the linguistic analysis of the query using the knowledge database and the dialog manager is further configured to trigger the transfer if a result of the linguistic analysis indicates that the query is outside of a scope of the knowledge database.

17. The live chat system of claim 16, wherein the at least one rule includes a user property including a very important person (VIP) priority status and further wherein the dialog manager is further configured to trigger the transfer if an identifier of a user profile associated with the user indicates the VIP priority status.

18. The live chat system of claim 13, wherein the at least one virtual agent is operatively coupled to a knowledge database and the at least one virtual agent further is configured to:
   gather metadata related to query and response interaction with the user;
   record each query and response interaction independent of whether or not the at least one virtual agent or the live chat operator sources the content of the response, each query and response interaction optionally recorded in association with the metadata gathered; and
   utilize content of a response sourced by the live chat operator in response to a user query transferred from the at least one virtual agent to the live chat operator to enhance the knowledge database, enabling the at least one virtual agent to source the content of the response to a future occurrence of the user query and prevent future transfer of the user query to the live chat operator.

19. The live chat system of claim 13, wherein the at least one virtual agent is further configured to:

provide a conversation history;

identify a start of a chat session based on an initial query entered by the user;

allocate a unique global session identifier for the chat session started;

provide the unique global session identifier with the conversation history provided; and identify an end of the chat session based on an end query entered by the user and, responsively, deallocate the unique global session identifier allocated.

20. The live chat system of claim 13, wherein the dialog manager is further configured to:

determine if the content of the response from the live chat operator is sourced to the user screen view within a predetermined timeframe; and source the content of the response if the predetermined timeframe is exhausted, wherein the dialog manager sources the content of the response based on the at least one proposed response and a comparison of the confidence metric determined by the NLU with a confidence threshold, wherein if the confidence metric is above the confidence threshold, the content of the response sourced is selected by the dialog manager from the at least one proposed response and if the confidence metric is not above the confidence threshold, the content of the response sourced is an alternative response.

21. The live chat system of claim 13, wherein a counter corresponds to the interjection time and further wherein the enabling further includes enabling the live chat operator to interact with the counter to prolong the interjection time.

22. The live chat system of claim 13, wherein the dialog manager is further configured to mirror all query and response interactions since a last response content was sourced by the live chat operator via the operator screen view.

23. A non-transitory computer-readable medium having stored thereon a sequence of instructions which, when loaded and executed by a processor, causes the processor to:

provide a response to a query, entered by a user via a user screen view and submitted to a virtual agent server hosting at least one virtual agent, the response provided to the user from the virtual agent server via the user screen view, in a manner maintaining continuity of conversation in the user screen view independent of whether the at least one virtual agent or a live chat operator, having access to the at least one virtual agent via a live chat server, sources content of the response;

apply a linguistic analysis to the query at the at least one virtual agent and determine at least one proposed response to the query and a confidence metric associated with the at least one proposed response determined;

transfer the query, with the at least one proposed response and the confidence metric determined, to the live chat operator via an operator screen view on an operator interface; and enable the live chat operator to override the at least one proposed response transferred or to select from the at least one proposed response transferred to source the content of the response in the user screen view, wherein, to provide the response, the processor is further configured to enable the live chat operator to validate or change response content, proposed by the at least one virtual agent, within an interjection time, the interjection time based on a confidence metric associated with the content proposed by the at least one virtual agent and whether or not the live chat operator changed a previous response proposed by the at least one virtual agent to a previous query.

24. The non-transitory computer-readable medium of claim 23, wherein a counter corresponds to the interjection time and further wherein the enabling further includes enabling the live chat operator to interact with the counter to prolong the interjection time.

25. The non-transitory computer-readable medium of claim 23, wherein the sequence of instructions further causes the processor to mirror all query and response interactions since a last response content was sourced by the live chat operator via the operator screen view.

* * * * *